United States Patent [19]

Furutani et al.

[11] Patent Number: 5,412,251

[45] Date of Patent: May 2, 1995

[54] CONTROLLER OF AN ENGINE DRIVING GENERATOR FOR AN ELECTRIC VEHICLE

[75] Inventors: Masayuki Furutani, Susono; Yoshihide Nii, Fuji, both of Japan

[73] Assignee: Toyota Jidosha Kabushiki Kaisha, Japan

[21] Appl. No.: 180,329

[22] Filed: Jan. 12, 1994

[30] Foreign Application Priority Data

Jan. 14, 1993 [JP] Japan .................. 5-004494
Feb. 16, 1993 [JP] Japan .................. 5-026887

[51] Int. Cl.⁶ .................. B60L 11/02; B60L 11/12
[52] U.S. Cl. .................. 290/16; 180/69.5; 290/45; 320/62
[58] Field of Search ............ 180/65.4, 64.5; 290/16, 290/45; 320/62

[56] References Cited

U.S. PATENT DOCUMENTS

| | | | |
|---|---|---|---|
| 3,792,327 | 2/1974 | Waldorf | 290/16 |
| 3,991,357 | 11/1976 | Kaminski | 320/62 |
| 4,187,436 | 2/1980 | Ekienne | 290/45 |
| 4,306,156 | 12/1981 | Monaco et al. | 290/17 |
| 4,951,769 | 8/1990 | Kawamura | 180/65.4 |
| 5,212,431 | 5/1993 | Origuchi et al. | 180/65.4 |
| 5,285,862 | 2/1994 | Furutani et al. | 180/65.4 |

FOREIGN PATENT DOCUMENTS

| | | |
|---|---|---|
| 50-21210 | 3/1975 | Japan . |
| 50-45239 | 4/1975 | Japan . |
| 55-157901 | 12/1980 | Japan . |
| 57-202842 | 12/1982 | Japan . |
| 4-29504 | 1/1992 | Japan . |

Primary Examiner—A. D. Pellinen
Assistant Examiner—Robert Lloyd Hoover
Attorney, Agent, or Firm—Finnegan, Henderson, Farabow, Garrett & Dunner

[57] ABSTRACT

Controller 40 receives accelerator opening and brake depressing amounts, and the output of an ammeter 30 and voltmeter 32 as inputs. In response to the state of these input signals, the controller 40 determines the timing to detect the state of charge (SOC) of the battery 10 and detects the SOC of the battery 10. That is, it is first judged that the SOC is not more than a predetermined value if the voltage of the battery 10 is not more than a predetermined value when the accelerator opening is not more than a predetermined value. It is next judged that the SOC is not more than a predetermined value if the voltage of the battery 10 is not more than a predetermined value when the brake is depressed beyond a certain degree. In these cases, the engine 24 is driven to cause a generator 22 to perform generation of electricity to charge the battery 10.

6 Claims, 5 Drawing Sheets

OVERALL CONFIGURATION

Fig. 1

OVERALL CONFIGURATION

BATTERY TERMINAL VOLTAGE
AT REGENERATIVE BRAKING

CONTROLLER OF AN ENGINE DRIVING GENERATOR FOR AN ELECTRIC VEHICLE

BACKGROUND OF THE INVENTION

1. Field of the Invention

The present invention relates to a decision of drive timing for an engine driven generator which is mounted in an electric vehicle.

2. Description of the Related Arts

In recent years advanced investigation has been made of electric vehicles from a viewpoint of its lower polluting properties. However, electric vehicles entail a drawback that the distance capable of being traveled per unit charge depends on the size of the battery loaded thereinto. Thus, attention is being given to the electric vehicle having an engine driven generator mounted therein.

This electric vehicle containing the engine driven generator usually travels as an electric vehicle and, when the capacity of the battery is deficient, drives the engine to effect the generation of electricity. In other words, when the state of charge of the battery is lowered, the engine is started to effect the electricity generation, and at the completion of the charge of the battery, the generation of electricity comes to a stop. Due to application to the electricity generation, in this case, the engine is capable of being set at substantially constant rotational speed and constant load, thereby suppressing the exhaust of polluting substances to a lower level.

This type of electric vehicle having such an engine driven generator mounted therein is disclosed in Japanese Patent Laid-open Publication No. 55-157901.

In the electric vehicle having such a conventional engine driven generator mounted therein, there is a need for a sensor (SOC sensor) for detecting the state of charge (SOC) of the battery in order to control the activation and stop of the engine driven generator. The apparatus disclosed in the above publication uses a pycnometer for detecting a specific gravity of the battery liquid in order to detect the SOC.

Disadvantageously, tills involves a drawback that the battery must be modified to mount the pycnometer. In addition, the battery of the electric vehicle is divided into a multiplicity of cells in view of outputting a high-voltage in the order of 200 V. Thus. the SOC obtained by the pycnometer may not accurately represent the SOC of the entire battery.

Some SOC sensors integrate the current discharged from the battery and, based on the amount of discharge, detect the SOC. These types of SOC sensors eliminate the necessity of modifying the battery itself. However, such SOC sensors require to be reset with a periodic full charge, and if charge and discharge are repeated for a long period of time without full charge, errors may accumulate. In particular, in the case where the charge is performed by the engine driven generator mounted in the vehicle, there is a large possibility of such a state occurring slice the battery is not fully charged by this charge. Also, In the case of deterioration of the battery, the errors may be increased.

If the SOC is not accurately detected, there may occur an overcharge or overdischarge, which may deteriorate the battery.

It is conceivable that when the SOC of the battery is lowered, the voltage is lowered and hence the SOC may be detected based on the voltage values. However, because the battery voltage is varied in accordance with the amount of load current to be applied to the load, a mere detection of the battery voltage does not permit an accurate grasp of the SOC. Under the condition separated from the load, it is when the SOC is lowered considerably that the voltage is largely reduced.

On the contrary, It is known that the voltage value at a larger load current presents a fairly good correlation with the SOC of the battery. Therefore, in Japanese Patent Laid-open Publication No. 50-21210, the SOC is considered to be deteriorated If the battery voltage is not more than a predetermined value when the load current applied to the motor is a large current not less than a predetermined value, thereby controllably actuating the engine driven generator to initiate the charge. According to this method, the SOC is detected based on the battery voltage, and the engine driven generator can be controlled without providing any specific SOC detector.

In the prior art described above, however, the detection of the SOC, that is, the timing to start the operation of the generator is limited to the case of larger load current. This results in a problem that the operation of the generator is not started under the conditions where the travel is continued with a relatively small load current and the battery is discharged. In the ordinary case, the capacity of the electricity to be generated by the generator is set on the basis of load current under ordinary travel which is not so large. Thus, if the generation of electricity is initiated with a larger load current, subsequent SOC of the battery may be possibly lowered. Then, if the travel is stopped, the key is removed, and the vehicle function is stopped under the deteriorated conditions of the SOC of the battery, a large amount of current is not allowed to flow due to the reduction in the SOC at the time of restart. Therefore, the generator is not started, which makes the travel as an electric vehicle impossible. In this case, it may also be impossible to start the engine for the generator.

SUMMARY OF THE INVENTION

The present invention was conceived to overcome the above problems, and an object is to provide a controller ensuring an accurate operating timing for an engine driven generator.

The present invention is characterized in that the engine driven generator is activated under conditions where an output torque of a motor is not more than a predetermined value and a voltage of a battery is not more than a predetermined value.

Under these conditions, a good correlation is established between the battery voltage and the state of charge (SOC) of the battery. This ensures an accurate detection of deterioration in the SOC. Further, the generation of electricity can be conveniently initiated when the output current of the battery is small, thereby ensuring a subsequent sufficient charge of the battery.

The detection of the output torque can be performed by detecting the accelerator opening or the battery output current. Moreover, the predetermined value of the output torque to start the generation of electricity is varied in response to the battery voltage at that time, so that there can be ensured a more accurate detection off the SOC and hence the control of start of electricity generation at an accurate timing.

The present invention is also characterized in that the operation of the engine driven generator is controlled in response to the battery voltage at the start of the regenerative braking.

For example, the start of the generation of electricity is controlled in accordance with Ehc results obtained through the comparison with a predetermined threshold value, and the stop of the generation of electricity is controlled in accordance with the results obtained through the comparison with another threshold value.

Due to a good correlation between the battery voltage at the start of the regenerative braking and the SOC of the battery, the deterioration in the SOC of the battery can be reliably detected. Thus, there is no need for a specific SOC sensor or the like, and an accurate detection of the SOC is ensured free from the accumulation of errors which may arise in the case of using a current integrator. This ensures a preferred control of electricity generation based on the detection results, and an accurate control of the charge of the battery by use of the generator. This effectively avoids an overcharge or overdischarge of the battery.

The activation and stop of the engine driven generator is preferably controlled on the basis of the results obtained through a plurality of comparisons. In particular, the generation of electricity is not allowed to start until the conditions for the start of the electricity generation are fulfilled a plurality of times. Such control of generation of electricity based on the results obtained through a plurality of comparisons reduces the erroneous detection due to noise involved in the detection value.

Furthermore, the control means controls the amount of electricity to be generated by the engine driven generator in response to the magnitude of the battery voltage at the start of the regenerative braking. Such change of the generation power in compliance to the SOC of the battery enables the charge to be carried out according to the running state.

DESCRIPTION OF THE PREFERRED EMBODIMENTS

Figure 1:
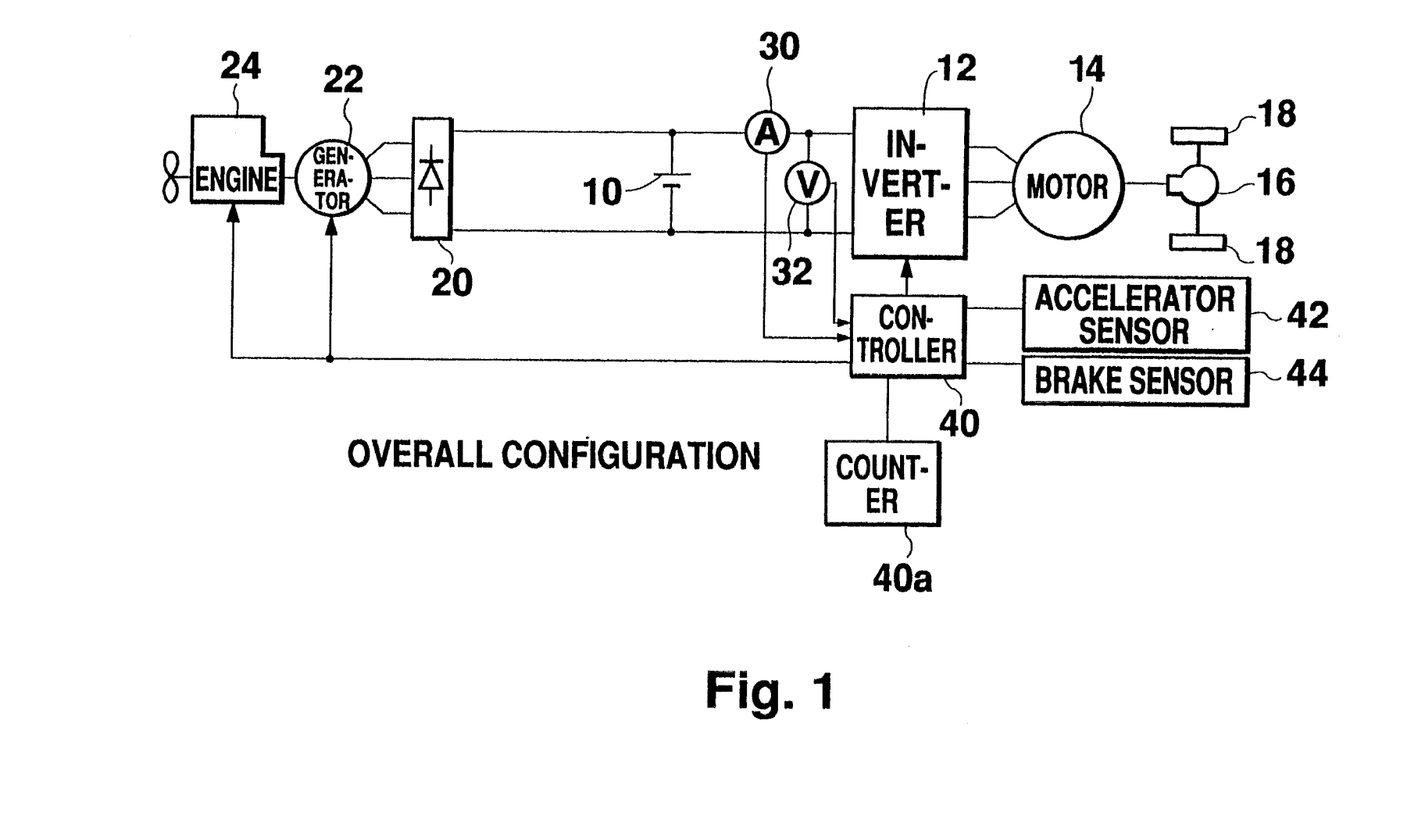
FIG. 1 is a block diagram showing an overall configuration of an embodiment of the present invention.

Exemplary embodiments of the present invention will now be described with reference to the accompanying drawings. FIG. 1 is a block diagram showing the overall configuration of an embodiment, in which a battery 10 is connected via an inverter 12 to a motor 14. The battery 10 commonly supplies a direct current power in the order of 200V to the inverter 12. The inverter 12 includes therein a plurality of switching transistors whose on-off switching operations convert the direct current power into a predetermined alternating current power for supply to the motor 14. This arrangement allows the motor 14 to be rotated at a predetermined output power by controlling the switching transistors of the inverter 12. The motor 14 can be an alternating current induction motor. The motor 14 is connected via a gear unit 16 to wheels 18 so that the rotation of the motor causes the rotation of the wheels 18 and hence the travel of an electric vehicle.

The battery 10 is connected to an electric generator 22 by way of a rectifier 20 which converts an alternating current power derived from the generator 22 into a direct current power so as to enable the battery 10 to be charged. An engine 24 is intended to drive the generator 22.

In this embodiment, on a path connecting the battery 10 to the inverter 12 there are provided an ammeter 30 measuring the magnitude of an electric current flow output from the battery 10, and a voltmeter 32 serving as a voltage detecting means to measure the magnitude of electric potential difference between terminals of the battery 10.

This embodiment further includes a controller 40 for controlling the inverter 12, generator 22 and engine 24. The controller 40 receives signals representing measurement results obtained from the ammeter 30 and the voltmeter 32, and receives command values with respect to a vehicle travel such as an accelerator opening detected by an accelerator sensor 42 and a brake depressing amount detected by a brake sensor 44. In response to the accelerator opening, the controller 40 acts to control the inverter 12 and thence the rotation of the motor 14.

This enables the motor output to be controlled in compliance with the accelerator opening, thereby ensuring a vehicle travel through the rotation of the wheels 18 depending on the accelerator opening. When the accelerator opening is zero, the controller 40 controls the inverter 12 to apply a regenerative braking force corresponding to an engine brake to the motor 14. It is to be noted that the accelerator opening is a value associated with an output torque of the motor 14 since the accelerator opening determines an output torque command for the motor 14.

The controller 40 calculates, based on signals received from the accelerator sensor 42, a torque current and an excitation current to be supplied to the motor 14, and controls the switching operation of the switching transistors of the inverter 12. Thus, the output of the motor 14 depends on the accelerator opening. When the accelerator opening is zero or the brake is depressed to indicate a deceleration, the controller 40 controls the inverter 12 to control the regenerative braking of the motor 14. The electric power derived from the regenerative braking is utilized for charging the battery 10. The vehicle is also provided with a mechanical braking device not shown which is used to obtain a desired braking amount. The controller 40 includes a counter 40a to perform a predetermined count of the occurrence of predefined events.

Since the battery 10 is connected via the rectifier 20 to the generator 22 described above, it can be charged with the electric power generated by the generator 22. The generator 22 is in turn connected to the engine 24 whose output is used to generate electricity by the generator 22. This electricity generation is also controlled by the controller 40.

The controller 40 further judges the state of charge (SOC) of the battery 10 based on the output of the ammeter 30 and voltmeter 32, thereby controlling the activation of the engine 24 and amount of electricity to be generated by the generator 22.

Embodiment 1

Figure 2:
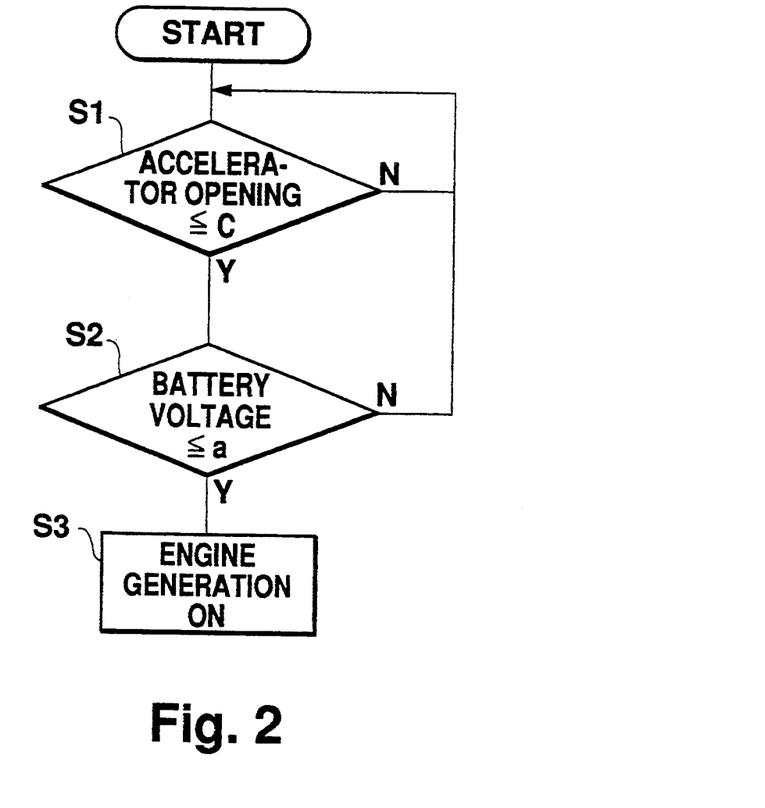
FIG. 2 is a flowchart explaining the action of Embodiment 2-1.

FIG. 2 is a flow chart determining the timing to initiate the electricity generation in this embodiment. It is first judged in this embodiment whether the accelerator opening is not more than a predetermined value c (S1). If the accelerator opening is not more than the predetermined value c, then it is judged whether the battery voltage is not more than a predetermined value a (S2). With Y in Steps 1 and 2, the engine 24 is energized to start the generator 22 to generate electricity (S3). Thus, in this embodiment, the voltage of the battery 10 is monitored in the case where the accelerator opening is not more than a predetermined value and where the electric current supplied from the battery 10 is not more than a predetermined amount, and If the voltage is substantially low, then it is detected that the state of charge (SOC) of the battery 10 is not more than the predetermined value to start electricity generation.

Figure 3:
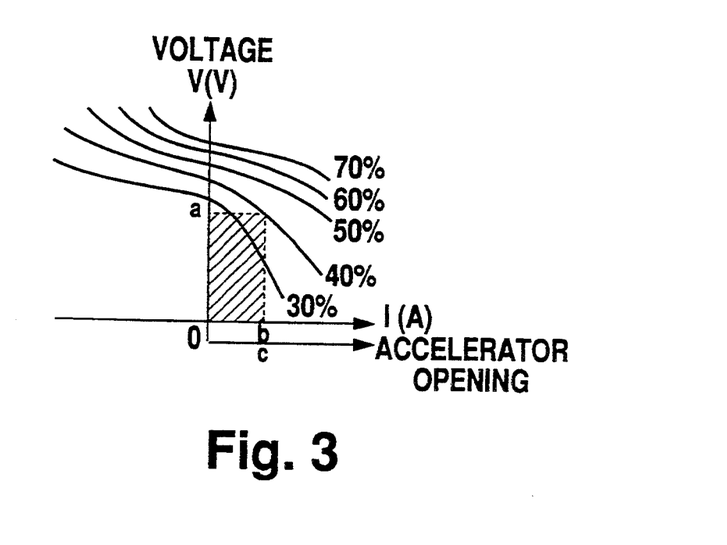
FIG. 3 is a characteristic diagram showing a relationship between an accelerator opening and a battery voltage in response to the state of charge (SOC)

FIG. 3 shows a relationship between the accelerator opening and the voltage of the battery 10. As is apparent from the figure, when the SOC is low, the battery voltage is low. When the accelerator opening is large and hence the current output from the battery is large, there is shown to be established a good correlation between the SOC and the voltage of the battery 10. However, it will be seen from this figure that, if the SOC is low, the SOC and the voltage of the battery 10 present an improved correlation irrespective of relatively small current (that is, the ratio of the change in the battery voltage to the change in the SOC becomes larger). Thus, it is judged in the present invention that the SOC is not more than 40% if the voltage of the battery 10 is not more than a when the accelerator opening is not more than c, in other words, the voltage of the battery 10 and the accelerator opening lie within the hatched range. The generation of electricity is initiated in response to the SOC of 40% or less.

Since the accelerator opening represents an output torque command value for the motor 14 as described above, there is established one-to-one correspondence between the accelerator opening and the output current of the battery 10. Due to this, it may be judged in S1 described above whether the output current of the battery 10 is not more than b instead of using the accelerator opening.

In this manner, the reduction In the SOC can be detected in this embodiment when the current output from the battery 10 is relatively small. Thus, by starting to generate electricity under this state, the amount of electricity generated by the generator 22 surpasses the current output from the battery 10 to ensure an effective recovery of the SOC of the battery 10.

It is to be appreciated that the voltage V and the output current I of the battery 10 are detected by the voltmeter 32 and the ammeter 30, respectively.

Although in the above embodiment the electricity generation is not effected until there are fulfilled the conditions that the accelerator opening is not more than c and that the battery voltage is not more than a, the electricity generation may be constantly initiated when the SOC reaches 40% or less, by storing the characteristics of the SOC 40% shown in FIG. 3 into a ROM and altering the voltage value a in response to the accelerator opening without fixing c and a.

Embodiment 2-1

Figure 4:
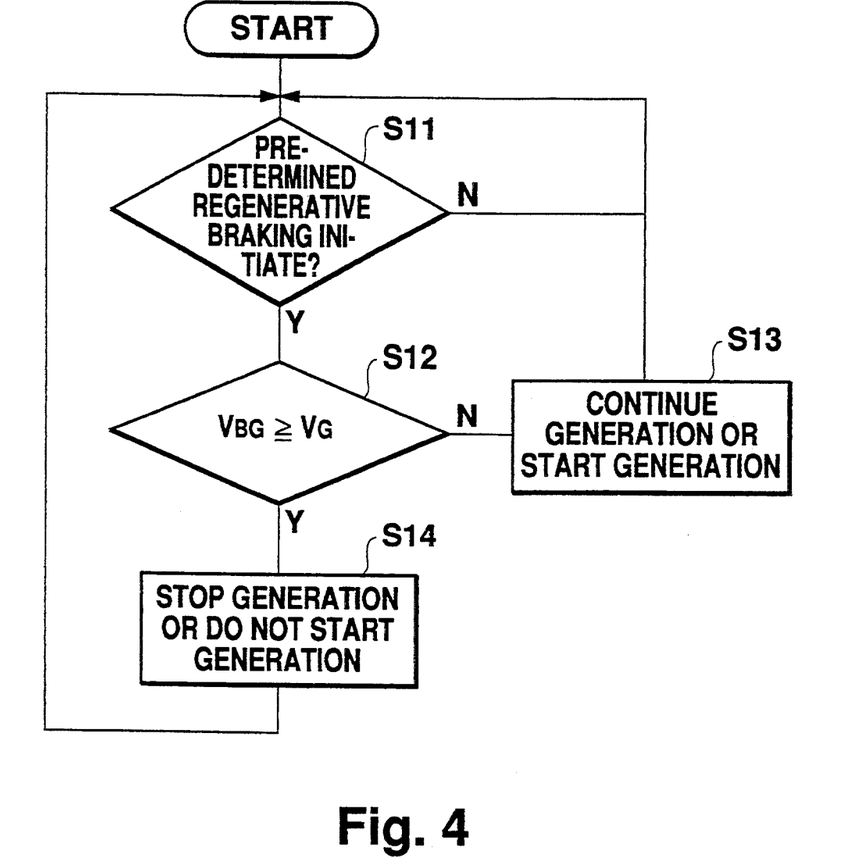
FIG. 4 is a flowchart explaining the action of Embodiment 2-1.

Referring next to FIG. 4, description will be given of another embodiment controlling electricity generation. In this embodiment, the SOC of the battery 10 is detected at the time of initiation of a predetermined regenerative braking. The controller 40 first Judges whether a predetermined regenerative braking has been started (S11). This judgment is made based on whether the brake depressing amount detected by the brake sensor 44 has exceeded a predetermined value. Since the brake sensor is an instrument measuring a brake oil pressure, this judgment is made based on the detected pressure. Because the controller 40 controls the inverter 12 to generate a predetermined large regenerative braking force due to a sufficiently large amount of deceleration of the vehicle caused by depressing the brake beyond a predetermined amount, it is judged whether a predetermined regenerative braking has been started based on to what degree the brake has been depressed.

In this embodiment, a voltage is measured between the terminals of the battery 10 when a voltage arises due to such large regenerative braking, and in accordance with this measured voltage value the SOC of the battery 10 is detected.

More specifically, if the brake depressing amount is not less than a predetermined value in S1, then the controller 40 performs a comparison $V_{BG} \geq V_G$ (S12). $V_{BG}$ is a voltage value between the terminals of the battery 10 detected by the voltage sensor 32 at the time of regenerative braking. On the contrary, $V_G$ is a voltage value to be obtained at the initiation of regenerative braking when the SOC of the battery 10 is at a predetermined lower level.

Figure 5:
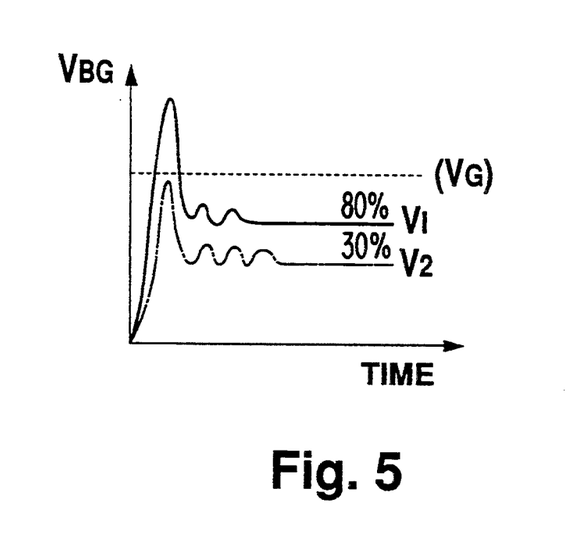
FIG. 5 is a characteristic diagram showing a relationship between a battery terminal voltage at regenerative braking and a threshold value in the Embodiment 2-1.

The voltage between the terminals of the battery 10 at the initiation of regenerative braking varies depending on the state of charge of the battery at that time. With good SOC (in the order of 80%) as shown in FIG. 5, for example, a curve $V_1$ appears when a charging current is supplied due to a regenerative braking. On the contrary, with the battery 10 in a poor SOC (in the order of 30%), the terminal voltage presents a substantially small rise as indicated by a curve $V_2$. Thus, if the value of $V_G$ is defined as the peak value of the terminal voltage of the battery 10 corresponding to the SOC to start the electricity generation, the timing to start the generation of electricity can be detected by the voltage peak at the initiation of the regenerative braking less than $V_G$. Therefore, if $V_{BG}$ is less than $V_G$ in S12, the generation of electricity is started (S13). It is to be noted that since this judgment is constantly made at the initiation of a predetermined regenerative braking, the electricity generation will be continued in S13 if it has been already started.

While on the contrary, if $V_{BG}$ is greater than $V_G$ in S12, then the SOC of the battery 10 exceeds a predetermined level, and hence the electricity generation will not be started or if it has been already started will be stopped (S14). Thus, if the SOC of the battery 10 has already been recovered by the charging current derived from the generator 22, $V_{BG} \geq V_G$ will be established in S12 at the next initiation of regenerative braking, and the generation of electricity will come to a stop.

Although the start and stop of the electricity generation is judged by a single threshold value in this embodiment, the period of the electricity generation may possibly be too short. Therefore, by setting the threshold value at the time of stopping the electricity generation to a value larger than $V_G$, it will also be preferable to control so as to, for example, start the electricity generation at 30% of SOC and stop at 60%.

Embodiment 2-2

Figure 6:
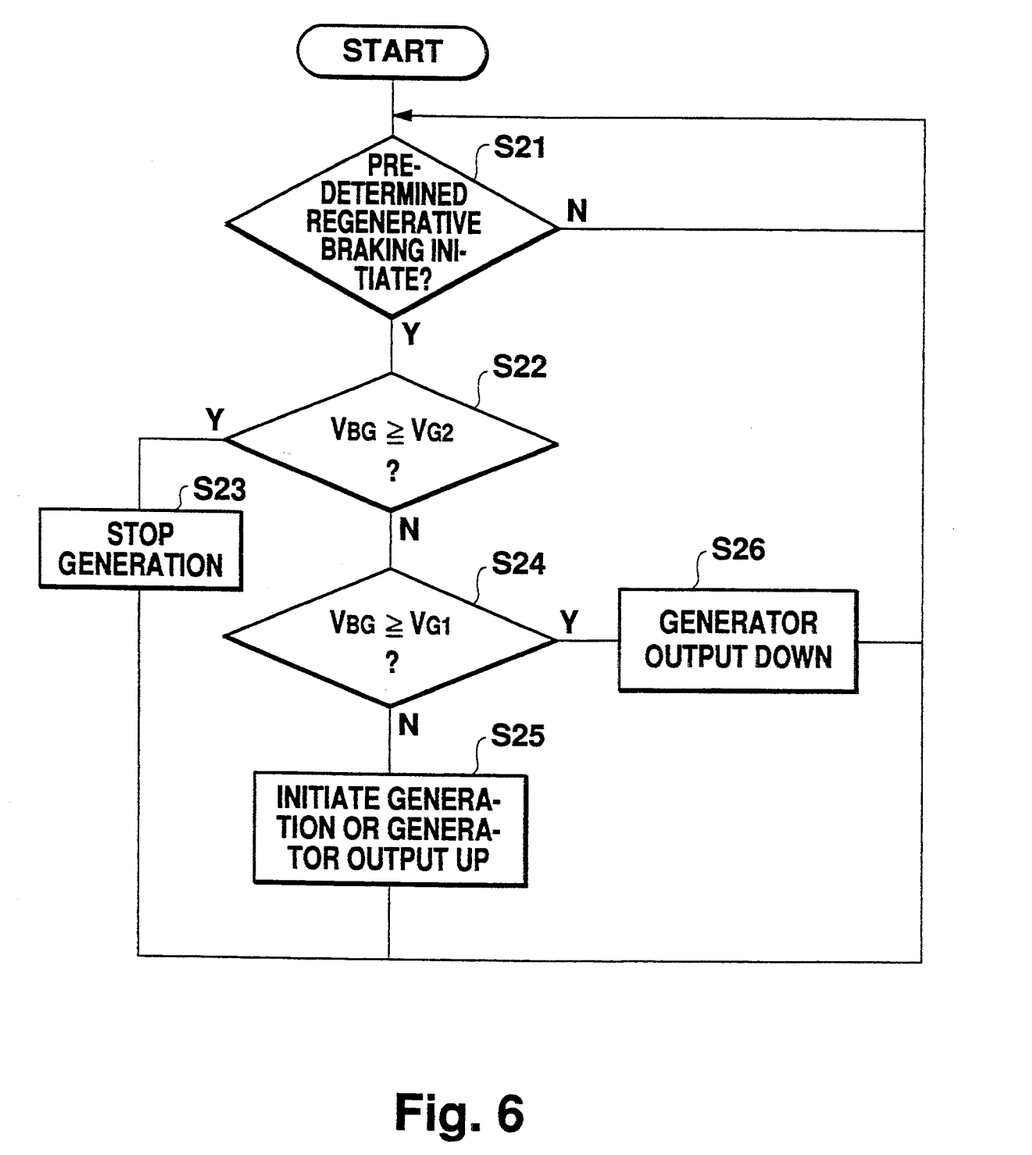
FIG. 6 is a flowchart explaining the action of Embodiment 2-2.

Referring next to FIG. 6, description will be given of a further action of the embodiment. The controller 40 first judges whether a predetermined regenerative braking is started (S21). The content of third judgment is the same as the case described above. Then, it is judged whether $V_{BG}$ is greater than $V_{G2}$ (S22), and if the terminal voltage is greater, the SOC is considered to be sufficiently good and the electricity generation is brought to a stop (S23). In this case, $V_{G2}$ is to be set as a value corresponding to a sufficiently high level of SOC in the order of 80%.

If $V_{BG}$ is less than $V_{G2}$ and the result in S22 is N, then it is judged whether $V_{BG}$ is greater than $V_{G1}$ (S24). In this case, the voltage $V_{G1}$ is set as a value corresponding to a poor SOC of the order of 30%, and if $V_{BG}$ is less than $V_{G1}$, it is judged that the SOC has been remarkably lowered to start the drive of the generator 22 or to increase the output of the generator (S25). On the contrary, with $V_{BG} \geq V_{G1}$ in S24, the SOC is not so poor, and hence the output of the generator 22 is decreased (S26).

According to this embodiment in this manner, the amount of electricity generated by the generator 22 is controlled in compliance with the SOC of the battery 10. More specifically, when the SOC is poor, in particular, when the SOC is further lowered irrespective of the start of electricity generation, the amount of the electricity generation may be increased to recover the SOC. On the other hand, when the state of charge is relatively good, the amount of electricity generation is controlled to be smaller. This ensures preferred charging control in response to the operating state of the battery 10. Preferably, the increase and decrease in the amount of electricity generation are restricted to predetermined several stages so as not to further alter the stages in S25 and S26. In the case of three stages, for example, the amount of electricity generation is normal immediately after the start of electricity generation, and then it is increased if the voltage $V_{BG}$ is lowered, and if the voltage $V_{BG}$ is recovered, the amount of electricity generation can be lower than the initial start of generation of electricity.

Figure 7:
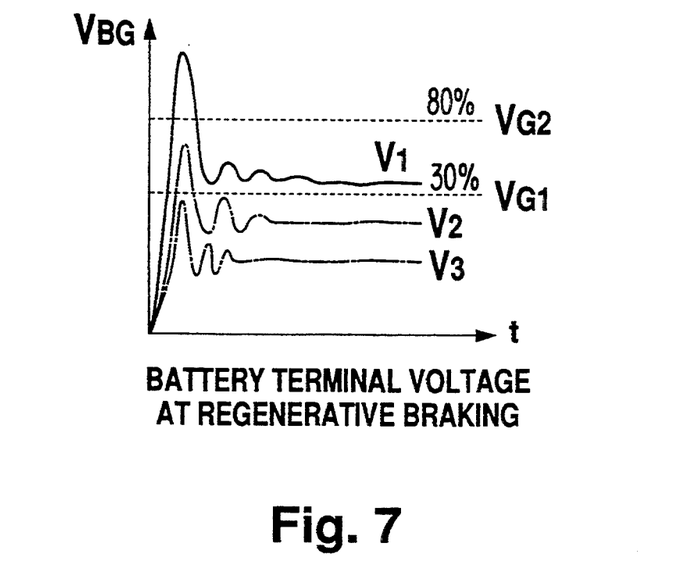
FIG. 7 is a characteristic diagram showing a relationship between a battery terminal voltage at regenerative braking and a threshold value in the Embodiment 2-2.

FIG. 7 illustrates characteristics of the battery terminal voltage upon the regenerative braking. In this example, if the terminal voltage is $V_1$, since it is larger than $V_{G2}$, the result in S22 is Y and the generation of electricity is stopped. If the terminal voltage is $V_2$, since it lies within the range defined between $V_{G1}$ and $V_{G2}$, the output of the generator 22 is decreased. Finally, the terminal voltage of $V_3$ would result in the start of the electricity generation or increase in output.

Embodiment 2-3

Figure 8:
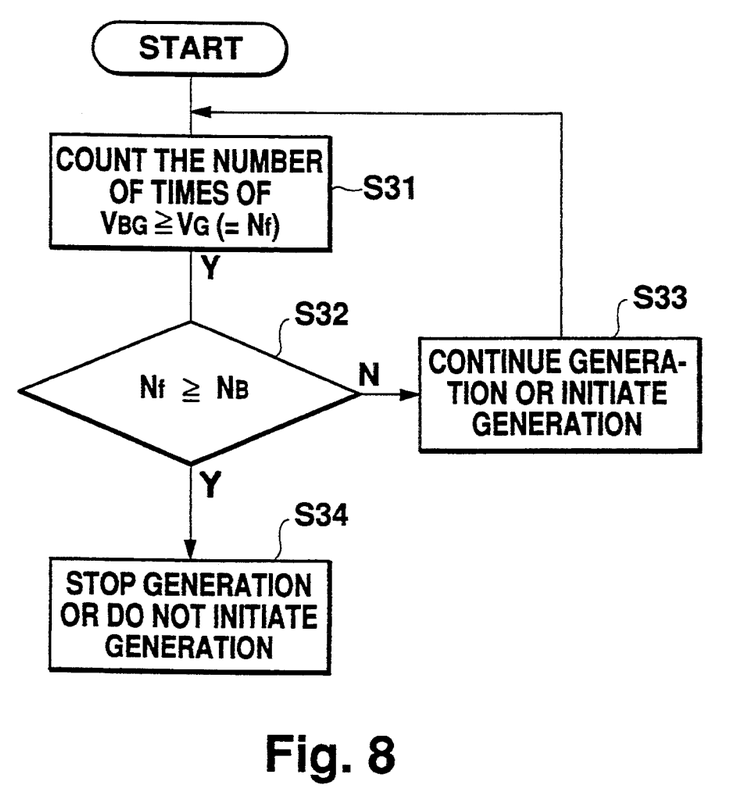
FIG. 8 is a flowchart explaining the action of Embodiment 2-3.

FIG. 8 is a flowchart showing a still further action, in which the battery terminal voltage is similarly monitored at the time of start of regenerative braking, but the number of peaks is counted. More specifically, the counter 40a counts the number $N_f$ of times when the peak voltage of the terminal voltage $V_{BG}$ at the start of regenerative braking exceeds a predetermined threshold value $V_G$ (S31), and then it is judged whether the number of times $N_f$ is greater than the predetermined value $N_B$ (S32). Then, the electricity generation is started or continued until $N_f$ exceeds $N_B$ (S33), and when exceeding the predetermined number of times, the generation of electricity comes to a stop (S34). Such control ensures a reliable detection of recovery of SOC of the battery 10, and ensures an accurate control without permitting errors which may be caused with one-time fluctuation in the voltage. This may also overcome the problem that the period of electricity generation is too short which may arise in the FIG. 4 embodiment. It is to be noted that the count value of the counter 40a must be reset to zero when starting the generation of electricity.

Alternatively, there may be counted the number of times by which the conditions for stopping the generation of electricity has been fulfilled so that, when the number reaches a predetermined number, the electricity generation is stopped.

On the contrary, if the above conditions are not fulfilled a consecutive predetermined number of times, the count value of the counter may be reset to zero. For instance, 1 is counted if the above-described drive start conditions are fulfilled once, but the count value is reset to zero if the above conditions are not fulfilled a subsequent consecutive five times. This operation ensures an effective removal of malfunctions.

Others

Since the time when the above output torque is not more than a predetermined value is different in timing from the time of starting the regenerative braking, it is preferable that the SOC of the battery 10 be detected at both timings to control the generation of electricity.

What is claimed is:

1. A controller for controlling the operation of an engine driven generator in an electric vehicle incorporating a motor to be driven by electric power derived from a battery wherein said engine driven generator charges the battery, said battery being supplied with a regenerative power generated at the time of regenerative braking of said motor, the controller comprising:

regenerative braking detection means for detecting the start of regenerative braking;

voltage detection means for detecting a battery voltage; and control means for receiving said detection values from said detection means and, in response to a battery voltage at the start of regenerative braking, for controlling the start of said engine driven generator.

2. A controller according to claim 1, wherein
   said control means compares said battery voltage at the start of the regenerative braking with a predetermined threshold value, and, based on obtained results, controls the activation of the engine driven generator.

3. A controller according to claim 2, wherein
   said control means further compares said battery voltage at the start of regenerative braking with another predetermined threshold value, and based on obtained results, stops the supply of power from said engine driven generator.

4. A controller according to claim 3, wherein
   said control means stores a plurality of comparison results obtained by comparing said battery voltage with either threshold value, and based on the plurality of comparison results stops the supply of power from said engine driven generator.

5. A controller according to claim 4, wherein said control means includes a counter, and controls the operation of the engine driven generator so as not to start the operation of said engine driven generator until conditions for starting the operation of said engine driven generator are fulfilled a predetermined number of times.

6. A controller according to claim 1, wherein said control means controls the amount of electricity to be generated during the operation of said engine driven generator in response to the magnitude of said battery voltage at the start of the regenerative braking.

* * * * *